July 8, 1969  H. ALBINGER, JR  3,454,799
TORSION WIRE TENSION SPRING FOR BATTERY OPERATED CLOCK
Filed Jan. 21, 1966

Inventor:
Harry Albinger Jr.
by Leonard Platt
Attorney

# United States Patent Office 3,454,799
Patented July 8, 1969

3,454,799
TORSION WIRE TENSION SPRING FOR BATTERY OPERATED CLOCK
Harry Albinger, Jr., Ashland, Mass., assignor to General Electric Company, a corporation of New York
Filed Jan. 21, 1966, Ser. No. 522,198
Int. Cl. H02k 33/00
U.S. Cl. 310—36                 6 Claims

ABSTRACT OF THE DISCLOSURE

A mechanism for adjusting the tension of a torsion member in order to adjust the oscillation frequency of the torsion member, wherein a first tension means supplies initial tension on the torsion member and a second tension means provides a fine adjustment of the tension on the torsion member.

---

Figure 1:
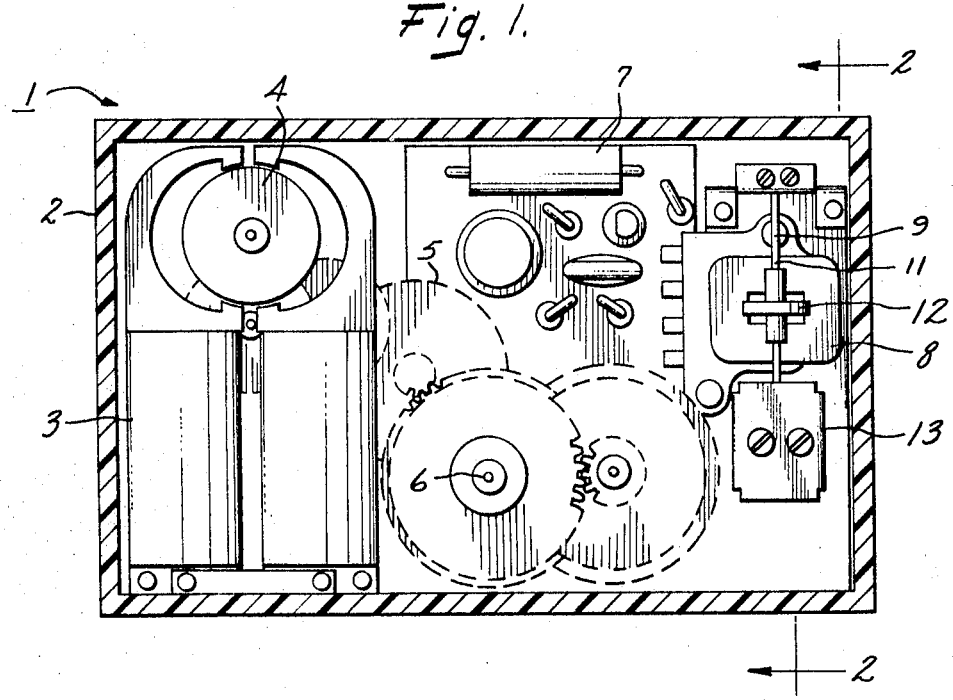

This invention relates to torsion member clocks and, more particularly, to an improved mechanism for adjusting the tension of the torsion member in order to adjust the oscillation frequency of the torsion member clock.

A torsion member clock generally comprises an electrically operated permanent magnet motor which drives the hands of the clock at a rotation rate which is controlled and synchronized by an electrical oscillator, the oscillation rate of the electrical oscillator being controlled by oscillations of a mechanical oscillator. The mechanical oscillator generally comprises a torsion member in the form of a wire having a permanent magnet mounted thereon and being positioned within a magnetic field. The magnetic field is established by an electric coil which is connected in a regenerative feedback circuit with the electrical oscillator. As the torsion member oscillates at its mechanical frequency, oscillation of the permanent magnet mounted on the torsion member induces signals in the coil and therefore the electrical oscillator, which signals are fed to the control circuit for the motor which drives the hands of the clock. In turn, the electrical oscillations induced in the coil by the electrical oscillator causes the permanent magnet to maintain its motion thereby maintaining the impetus on the torsion member so that it continues to oscillate at its mechanical frequency. Since the torsion member oscillates at a constant frequency depending only upon the mechanical characteristics of the torsion member itself, it can be seen that the rate of rotation of the clock hands can be accurately controlled by adjusting the mechanical characteristics of the torsion member.

In order to produce a more accurate torsion member clock it is desired to obtain a means for adjusting the mechanical oscillation frequency of the torsion member as nearly precisely as possible.

It is therefore an object of this invention to provide an improved means for adjusting the mechanical oscillation rate of a torsion member in a torsion member clock.

It is another object of this invention to provide an improved means for varying the tension on a torsion member to obtain greater accuracy in a torsion member clock.

It is a further object of this invention to provide a means for obtaining a coarse and a fine adjustment of tension on a torsion member in order to obtain greater accuracy in a torsion member clock.

It is still further object of this invention to provide a means for obtaining a fine adjustment in the tension of a torsion member while at the same time eliminating undesirable effects due to slippage in the fine tension adjusting means.

These and further objects of this invention are obtained in one form in a torsion member clock in which the torsion member is supported by two support members, the permanent magnet mounted on the torsion member being disposed between the two support members. While one of the support members frictionally secures one end of the torsion member without providing any means for adjusting the tension thereof, the other of the support members is connected to a tension spring including two extensions, each of which provides a portion of the total tension supplied by the spring to the torsion wire. The first extension member of the spring supplies the greater majority of the total tension supplied to the torsion member and is initially adjusted and then fixed. The second extension of the spring is provided with means for adjusting its tension and therefore the tension supplied by the spring to the torsion member. This latter mentioned means generally comprises a non-slip means whereby large adjustments to it produce only small accurate adjustments in the tension in the second extension member of the spring. In this manner a coarse and fine adjustment in the tension supplied to the torsion member is provided. Since the oscillating frequency of the torsion member is controlled by the tension thereon, an improved frequency adjusting means is provided.

Figure 2:
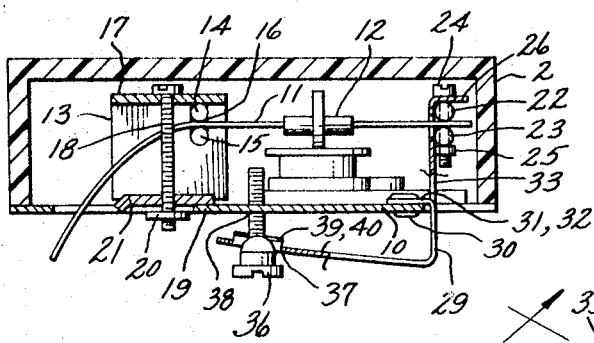
Figure 3:
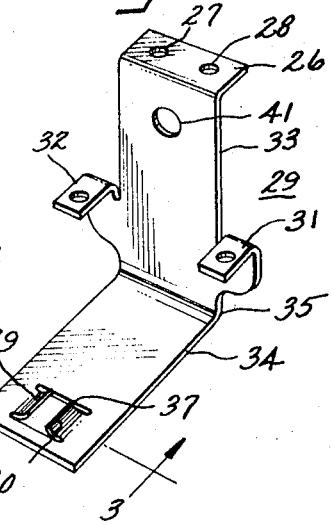
Figure 4:
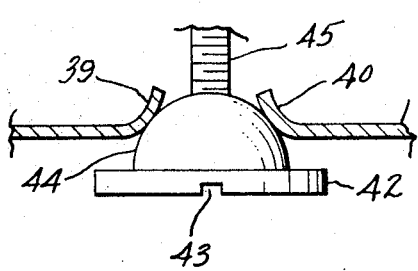

For a more detailed description of this invention, reference is made to the following specifications and the accompanying drawings of which:

FIG. 1 is an elevation view of sections having the general components of a torsion member clock, FIG. 2 is a side view of a torsion member clock showing only the torsion member mechanism, FIG. 3 is a perspective view of the tension spring according to the teachings of this invention, and FIG. 4 is a sectional view taken along the lines 3—3 of FIG. 3 and shows a non-slip adjusting means according to further teachings of this invention.

Referring to FIG. 1 a torsion member clock 1 is shown including a casing 2 and a pulse or AC permanent magnet motor 3 having a rotor 4 which is coupled in driving engagement with a gear train 5 for a driving of a pair of clock hands (not shown) by means of the concentric shaft mechanism 6. The rotor 4 is powered by electrical signals from an electrical oscillator circuit 7. A coil 8 is electrically connected to the electrical oscillator circuit 7 and is positioned adjacent to an electromagnetic-mechanical torsion member mechanism 9. For a more detailed description of a torsion member clock and in particular the motor and the electrical oscillator circuit in a torsion member clock reference is made to United States Patent 3,142,012, Petrides, July 21, 1964.

The torsion member mechanism 9 is seen more clearly in FIG. 2 where there is shown three sides of the casing 2 of the torsion member clock 1 with a fourth side 10 comprising a base support member for supporting various elements of the torsion member mechanism 9. The torsion member mechanism 9 includes a wire 11 upon which a permanent magnet 12 is fixedly secured adjacent the coil 8 which is part of the electrical oscillator circuit 7 of the torsion member clock 1. The torsion wire may be of a rectangular cross section or any other convenient cross section so long as it exhibits acceptable torsion characteristics for producing uniform torsional oscillations. One end of the torsion wire 11 is secured to a first support member 13 by a pair of pins 14 and 15 riding in a slot 16 provided in opposite sides of the support member 13. The torsion wire 11 is held in frictional engagement between the pins 14 and 15 by the action of a top plate 17 being forced down on the top of the pin 14 by a clamping bolt 18. The clamping bolt 18 fits through an aperture in the top plate 17 and through another aperture in the bottom side 19 of the support member 13 and is secured to the base support member 10 by means of a nut 20. The bottom side 19 is included with ears 21 which can ride in slots provided in the base member 10 for a lateral adjustment of the support member 13 and therefore the torsion wire 11. Instead of a single bolt 18, a pair of bolts may be utilized in conjunction with a double nut in order to obtain better engagement of the torsion wire 11. The means of securing this end of the torsion wire 11 by the support member 13 does not form part of this invention and therefore further detailed discussion of it is deemed unnecessary.

Suffice to say that a frictional engagement with the torsion wire is obtained which does not permit changes in the oscillating length of the wire at that end.

The opposite end of the torsion wire 11 is frictionally secured between another pair of pins 22 and 23 which are clamped together by means of a bolt 24 and a nut 25, the bolt being threaded through holes in the pins 22 and 23 and through an aperture in a flange member 26. Better frictional engagement may be obtained by the utilization of a pair of bolt and nut assemblies being threaded through pairs of holes in the pins 22 and 23 and in the flange member 26. The flange member 26, with a pair of aperture holes 27 and 28 for receiving the bolts 24, is shown in FIG. 2 as being an integral part of a tension spring 29.

The tension spring 29 is secured to the base member 10 by means of rivets 30 being placed through apertures in a pair of flange members 31 and 32 more easily seen in FIG. 2. The tension spring 29 generally comprises a first extension piece 33 extending between the flange member 26 and the pair of flange members 31 and 32 and a second extension member 34 extending beyond the pair of flange members 31 and 32 and away from the first extension member 33 and including an angular bend 35. At the far end of the second extension member 34 a shaped nut and bolt assembly 36 is positioned through an aperture 37 in the second extension member 34 and through a threaded aperture 38 in the base support member 10 for obtaining support of the second extension member 34. The aperture 37 in the second extension member 34 for receiving the shaped nut and bolt assembly 36 is more clearly shown in FIG. 2 to include two upturned portions 39 and 40 which are formed after making a series of slits in the second extension member 34 in the shape of an I.

The pair of pins 22 and 23 frictionally engage the torsion wire 11 in the same manner as the pins 14 and 15 so that the total oscillation length of the torsion wire 11 extending between the two pairs of pins remains invariant. Changes in the oscillation frequency of the torsion wire 11 are thus not made by changing its oscillation length but rather are made by varying the tension supplied to the torsion wire 11 by the action of the tension spring 29 on the torsion wire 11 through the medium of the pairs of pins 22 and 23 and its associated clamping means.

The torsion spring 29, more clearly shown in the perspective view of FIG. 3 includes an aperture 41 shown near the upper end of the first extension member 33 for allowing the torsion wire 11 to extend therethrough. A predetermined amount of tension can be imparted to the torsion wire 11 by proper adjustment of the tension in the first extension member 33 prior to fixedly securing it at the pair of flange members 31 and 32 to the base member 2 with the rivets 30. This tension adjustment is usually rather coarse and is selected to impart most of the total tension desired on the torsion wire 11 leaving only a small amount of extra tension to be supplied by a fine adjustment mechanism to be hereinafter explained.

The second extension member 34 of the tension spring 29 is designed to supply a small amount of extra tension to the total tension imparted by the tension spring 29 to the torsion wire 11. By adjusting the shaped nut and bolt assembly 36 by turning it clockwise or counterclockwise in the threaded hole 38, the degree of angular bend at 35 between the first extension member 33 and the second extension member 34 can be varied thus providing an adjustment of the extra tension imparted to the torsion wire 11 by the extension spring 29. By providing a very fine pitched screw thread in the bolt portion of the shaped nut and bolt assembly 36, it will require many turns of the shaped nut to obtain a small variation in the angular bend 35 of the tension spring 29, thus providing a fine adjustment of the total tension imparted thereby to the torsion wire 11.

The portion of the shaped bolt and nut assembly extending through the aperture 37 in the second extension 34 is shown more clearly in FIG. 4 which is a sectional view taken along the lines 3—3 of FIG. 3. In FIG. 4 the shaped bolt and nut assembly 36 is shown to comprise a head member 42 including a slot 43 for receiving a screwdriver and a hemispherical shaped member 44 secured to the head member 42 and through which extends a threaded portion 45. The curved sides of the hemispherical shaped portion 44 engage the upturned members 39 and 40 so that when the head member 42 is turned the hemispherical shaped portion 44 rides inwardly and outwardly of the slotted aperture 37. The threaded member 45 is supplied with a very fine pitch screw thread so that it requires very many turns of the head member 42 to cause the hemispherical portion 44 to ride a short distance into or out of the slotted aperture 37. As the hemispherical portion 44 moves upward in the slotted aperture 37, the upturned portions 39 and 40 are forced slightly upward thereby causing a slight variation in the angular bend 35 of the tension spring 29. The angular bend 35 can be varied in the opposite direction by turning the head member 42 such that the hemispherical portion 44 moves downward in the slotted aperture 37. In this manner a fine adjustment in the tension of the spring 29 is obtained. For all positions of the hemispherical member 44 in the slotted aperture 37 a positive engagement between the hemispherical portion 44 and the upturned members 39 and 40 is obtained. Therefore there is no possibility for the shaped nut and bolt assembly 36 to skip within the slotted aperture 37 which would cause spurious variations in the tension in the second extension member 34. With this non-slip feature the fine tension adjustment mechanism can be varied throughout its entire effective range and returned to various desired positions without fear that the degree of tension imparted to the tension spring 29 at any particular setting of the fine tension adjusting means will be different than the tension resulting from a previous adjustment to that same setting.

It is therefore apparent that applicant's invention provides a dual adjustment of the tension on the torsion member in a torsion member clock by means of an integral tension imparting device. With this device both a coarse and fine adjustment of the frequency of oscillation of a torsion member clock are obtained. Although the invention has been described with reference to a preferred embodiment, applicant does not wish to be limited to this specific embodiment but rather desires to be protected by the full spirit and scope of the appended claims.

What I claim as new and desire to secure by Letters Patent of the United States is:

1. In a torsion member clock having an electric motor, and an adjustable electromagnetic-mechanical oscillator for controlling the speed of the electric motor comprising:
  (a) a torsion member, said torsion member having a magnet mounted thereon for torsional oscillation within a magnetic field,
  (b) a first support securing a first end of said torsion member,
  (c) a second support for securing a second end of said torsion member,
  (d) means for adjusting said second support member to vary the tension of said torsion member for adjusting the frequency of oscillation of said torsion member, said adjusting means comprising
  (1) first tension means for providing tension on said torsion member, and
  (2) second adjustable tension means for providing a fine adjustment of the tension on said torsion member, said means for adjusting said second support member to vary the tension of said torsion member comprising a spring member, said first tension means comprising a first extension of said spring, and said second adjustable tension means comprising a second extension member of said spring.

2. An adjustable electromagnetic-mechanical oscillator as recited in claim 1 wherein said first extension member is rigidly secured for nonadjustment after its tension has been set.

3. An adjustable electromagnetic-mechanical oscillator as recited in claim 2 wherein said second extension member extends beyond said first extension member as an integral part thereof.

4. An adjustable electromagnetic-mechanical oscillator as recited in claim 3 wherein said second extension member includes an angular bend.

5. An adjustable electromagnetic-mechanical oscillator as recited in claim 2 and further including means for adjusting the tension in said second extension member, said means comprising a shaped nut and bolt assembly adapted to ride in a shaped aperture provided in said second extension member.

6. An adjustable electromagnetic-mechanical oscillator as recited in claim 5 wherein said shaped nut and bolt assembly comprises,
  (a) a hemispherical shaped portion for engageably riding in said shaped aperture, and
  (b) an adjustable fine pitched screw member, the adjustment of which controls the relative position of said hemispherical shaped portion in said shaped aperture.

References Cited

UNITED STATES PATENTS

| 3,008,070 | 8/1968  | Nemeth        | 335—276    |
| 1,948,104 | 2/1934  | Firestone et al. |         |
| 2,815,477 | 12/1957 | Dunn et al.   | 331—154 XR |
| 3,060,334 | 10/1962 | Faure         | 310—38     |
| 3,137,992 | 6/1964  | Baumgartner   | 58—131 XR  |
| 3,161,813 | 12/1964 | DeWolf et al. | 318—138    |
| 3,176,171 | 3/1965  | Baumgartner   | 310—36 XR  |

FOREIGN PATENTS 541,399   5/1957   Canada.

MILTON O. HIRSHFIELD, *Primary Examiner.*

D. F. DUGGAN, *Assistant Examiner.*

U.S. Cl. X.R.

318—138; 335—274